G. GUNTHER.
Feed-Cup for Bird-Cages.

No. 133,442. Patented Nov. 26, 1872.

Witnesses:
Ernst Bilhuber.
C. Wahlers.

Inventor.
G. Gunther
By VanSantvoord Hauff
his atty

UNITED STATES PATENT OFFICE.

GOTTLOB GÜNTHER, OF NEW YORK, N. Y.

IMPROVEMENT IN FEED-CUPS FOR BIRD-CAGES.

Specification forming part of Letters Patent No. 133,442, dated November 26, 1872.

*To all whom it may concern:*

Be it known that I, GOTTLOB GÜNTHER, of the city, county, and State of New York, have invented a new and Improved Combination Feed-Cup for Bird-Cages; and I do hereby declare the following to be a full, clear, and exact description thereof, which will enable those skilled in the art to make and use the same, reference being had to the accompanying drawing forming part of this specification, in which drawing—

Figure 1:
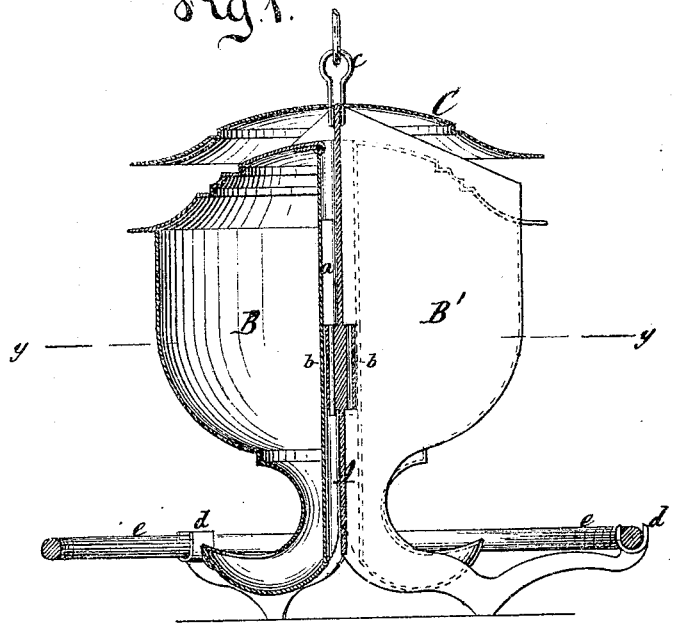
Figure 2:
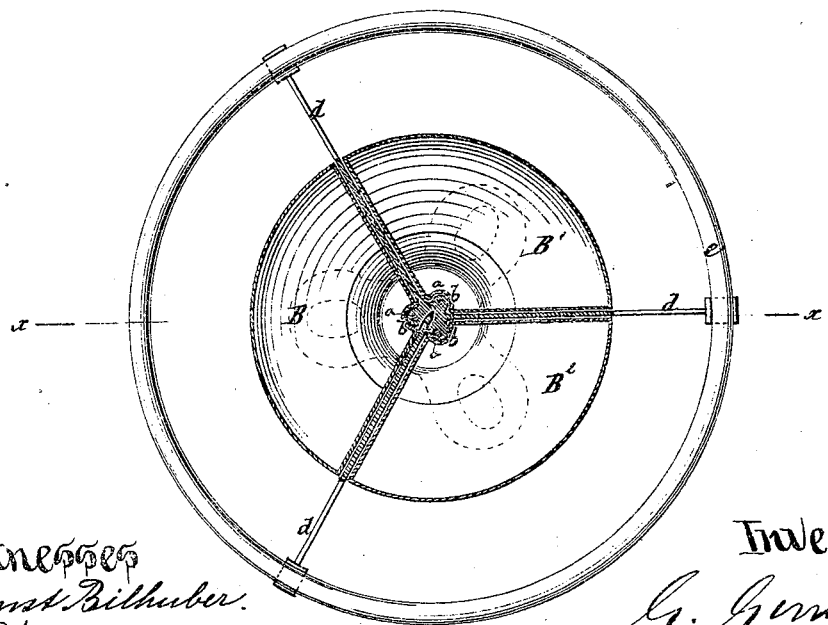

Figure 1 represents a transverse section of this invention in the plane $x\ x$, Fig. 2. Fig. 2 is a horizontal section of the same in the plane $y\ y$, Fig. 1.

Similar letters indicate corresponding parts.

This invention consists in a frame carrying two or more cups, said frame being secured in the interior of the cage in a convenient position for the bird to reach the contents of the cups in such a manner that the water, seed, or sand spilled by the bird from either of the cups is retained in the cage, and that by removing the frame from the cups convenient access can be had to the several cups for the purpose of cleaning or refilling the same; further, in a frame carrying two or more cups, said frame being provided with arms supporting a perch in a convenient position in relation to the spouts or apertures of the several cups in such a manner that the bird by alighting on the perch can easily reach the contents of either of the cups; also, in a protecting hood extending over the tops of the cups and the cup-carrying frame in such a manner that all impurities dropping down from above are caught by the hood, which can readily be cleaned, while the tops of the cups and of the cup-carrying frame are effectually protected against such impurities.

In the drawing, the letter A designates a frame containing two or more compartments for the reception of the cups B $B^1$ $B^2$. In the example shown in the drawing, the frame contains three compartments to receive a cup, B, for water, a cup, $B^1$, for seed, and a cup, $B^2$, for sand or gravel; but my cup-carrying frame may be provided with two compartments only, one for the water-cup and the other for the seed-cup; or, if desired, more than three compartments might be provided. The cups B $B^1$ $B^2$ are connected to the frame by hooks $a$ and loops $b$, the hooks being secured to the cups and the loops to the frame; but any other suitable fastening device may be substituted for the hooks and loops, provided such fastening device allows of connecting and disconnecting the cups with ease and facility. The cups are by preference made on the principle of fountains, where the body of each cup protects its spout or discharge-opening; and the cup-carrying frame is by preference provided with a loop, $c$, so that it can be conveniently suspended from the top of the cage. If desired, however, said frame may be secured in the interior of the cage in any convenient position giving the bird convenient access to the several cups. If the cup-carrying frame is to be suspended in the interior of the cage, I provide the same with arms $d$, serving to support a perch, $e$, which is in such a position in relation to the spouts of the cups that the bird, when alighting on the same, can conveniently reach the contents of either of the cups.

By placing the cup-carrying frame in the interior of the cage, the bird is prevented from spilling a portion of the contents of the cups beyond the cage, whereby cleanliness in the room is promoted, and by removing said frame from the cage convenient access is had to the several cups.

On the top of the cup-carrying frame I place a hood, C, which is so arranged that it can be readily taken off, and which protects the tops of the frame and of the cups against impurities dropping down from above. The protecting-hood can be easily cleaned whenever it may be desired.

It is obvious that the cup-carrying frame, the cups, and the hood can be made of any suitable material, such as metal, India rubber, *papier-maché*, or glass.

What I claim as new, and desire to secure by Letters Patent, is—

1. The arrangement of a frame carrying two or more cups, said frame being secured in the interior of the cage in a convenient position for the bird to reach the contents of the several cups, substantially as herein described.

2. A cup-carrying frame, provided with arms supporting a perch, substantially as set forth.

3. A protecting-hood, in combination with a cup-carrying frame, and with two or more cups secured in said frame, substantially in the manner and for the purpose described.

GOTTLOB GÜNTHER.

Witnesses:
W. HAUFF,
E. F. KASTENHUBER.